United States Patent [19]
Ando et al.

[11] Patent Number: 4,816,153
[45] Date of Patent: Mar. 28, 1989

[54] FRAME MEMBER FOR PRESSURIZED SCREENING DEVICE

[75] Inventors: Masatoshi Ando; Hiromine Mochizuki, both of Hyogo, Japan

[73] Assignee: Kanzaki Paper Manufacturing Co., Ltd., Tokyo, Japan

[21] Appl. No.: 61,739

[22] Filed: Jun. 11, 1987

[30] Foreign Application Priority Data

Jun. 17, 1986 [JP] Japan ............................ 61-92855

[51] Int. Cl.4 ........................ B01D 35/28; B07B 1/49

[52] U.S. Cl. .................................. 210/445; 209/319; 209/403; 209/405; 210/453

[58] Field of Search .............................. 209/403–405, 209/413, 319; 210/232, 445, 453

[56] References Cited

U.S. PATENT DOCUMENTS 1,075,500 10/1913 Schmits ............................ 160/378
2,183,991 12/1939 Hasman ............................ 209/403
2,213,773 9/1940 Symons .
2,753,999 7/1956 Miller et al. .
3,176,843 4/1965 Hoskins et al. .
3,341,013 9/1967 Moulton .
3,776,382 12/1973 Wright et al. .
3,888,765 6/1975 Bolk ................................ 209/352
4,568,455 2/1986 Huber et al. ...................... 209/405
4,582,597 4/1986 Huber ............................ 209/405 X

OTHER PUBLICATIONS

U.S. Patent Application Ser. No. 729,799 to Masatoshi Ando et al.

*Primary Examiner*—Charles Hart
*Attorney, Agent, or Firm*—Morgan & Finnegan

[57] ABSTRACT

The frame member for pressurized screening device includes an inflatable tube disposed along and outwardly of the peripheral wall of the frame. A screen is stretched over an opening in the frame and extends above the peripheral wall and the inflatable tube so that the inflatable tube can be brought into contact with the screen to impart tension to the screen. The inflatable tube is only inflatable in a direction transverse to the direction of the stretching of the screen and in such a manner as not to touch the holder member. A holder member is removably mounted on the screen attaching portion of the frame to sandwich the screen between the upper surface of the screen attaching portion and the lower surface of the holder member.

8 Claims, 2 Drawing Sheets

Fig.1.
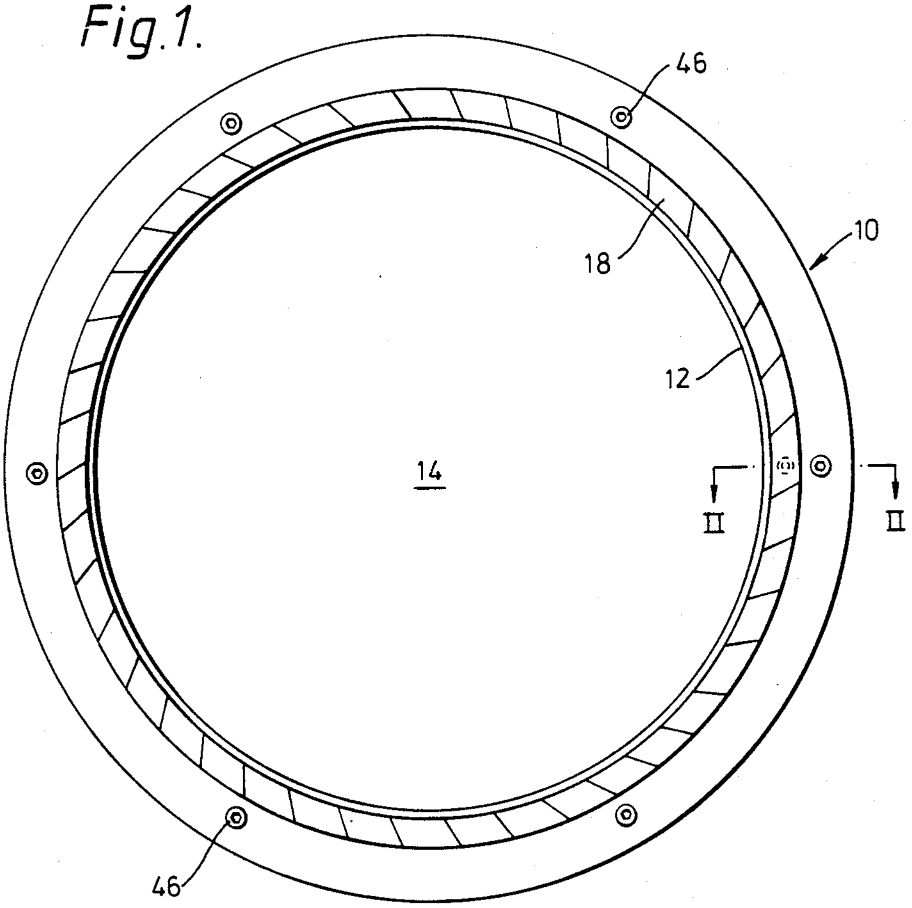
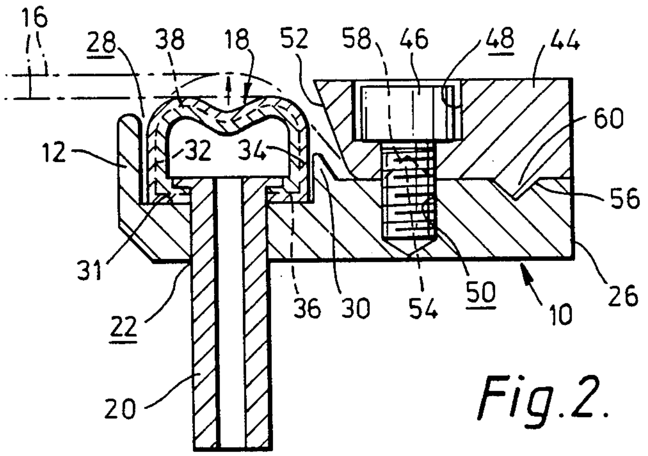
Fig.2.

FRAME MEMBER FOR PRESSURIZED SCREENING DEVICE

FIELD OF THE INVENTION

The present invention relates to improvements in a frame member for a pressurized screening device which attach a screen to the frame such that tension is distributed uniformly throughout the screen.

BACKGROUND OF THE INVENTION

A treatment for removal of foreign material from material such as powder, particles or liquid, filtration or dehydration has heretofore been made to use an oscillating motor and the like, by which the foreign material is removed in such a manner that the screen oscillates. In a case that the screen is broken during treatment of the material, an operator must stop the screening operation and replace the broken screening device into the new one to start the operation again. The broken screening device is prepared for the following operation by fixing a separate screen.

However, a plurality of screening devices are commonly used in a conventional way by an expert pertaining to the art of the screening. The operator must replace the broken screen into the new one and spend a plenty of time. It also requires a high degree of skill to attach the screen to the frame uniformly. Therefore, the research for the cause of breakage of the screen clarifies that it causes some constructional defects of the screening device rather than the scratch or wear by the material as having heretofore been known to the expert and the screen breaks mainly in the vicinity of the portion fastened by the bolts and the like.

Therefore, this applicant had filed an application concerning an invention entitled to "A screen frame" (Japanese Utility Model Application No. 36444 of 1985) as disclosed in FIG. 4, so as to eliminate the above-noted problem.

This type of the screening device has an excellent feature that the screen (a) can be uniformly attached to the frame (b) in an extremely short period and the screening device can be continuously operated over a long period, compared with a conventional one.

However, when the inflatable tube (c) is inflated by pressured gas, the tube (c) will press the screen (a) against the inner surface (d) of the holder member (e) as indicated by an alternate long and two dashes line in FIG. 4. As a result, it has become evident that the screen (a) has been broken by the wear at the portion touching the holder member (e).

SUMMARY OF THE INVENTION

It is an object of the present invention to provide a frame member which the screen may be easily replaced into the new one in an extremely short period, requiring no skill.

It is another object of the present invention to provide a frame member which can eliminate the possibility of the breakage of the screen effectively and can be continuously operated over a long period.

Other and further objects of this invention will become obvious upon an understanding of the illustrative embodiments about to be described or will be indicated in the appended claim, and various advantages not referred to herein will occur to one skilled in the art upon employment of the invention in practice.

A frame member for pressurized screening device comprises a frame including a vertical peripheral wall, said peripheral wall defining an opening therein. A screen is stretched over said opening to cover said opening, while an inflatable tube is disposed along and outwardly of said peripheral wall, said tube being connected to a pressure source. The frame has a radially extending screen attaching portion disposed outwardly of said tube and means for holding said tube between said screen attaching portion and said peripheral wall, said screen extending over said peripheral wall and said tube to the upper surface of the screen attaching portion. A holder member is disposed on the upper surface of the screen attaching portion sandwiching the screen between the upper surface of the screen attaching portion and the lower surface of the holder member. The inflatable tube is only inflatable in a direction transverse to the direction of the stretching of said screen and in such a manner as not to touch said holder member. Thus, the inflatable tube is brought into contact with said screen and tension can be imparted to said screen by said tube. The holder member is removably mounted on the upper surface of said screen attaching portion by a plurality of cap bolts.

BRIEF DESCRIPTION OF THE DRAWINGS

FIG. 1 is a schematic view showing an embodiment applied a screening device of the present invention to a frame member of Dalton-type oscillating screen;

FIG. 2 is an enlarged sectional view taken substantially along the lines II—II of FIG. 1;

DETAILED DESCRIPTION OF THE INVENTION

Figure 3:
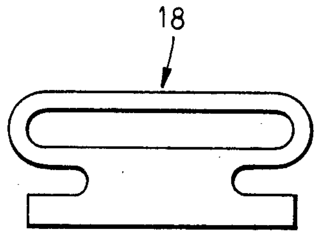
FIG. 3 is a view showing another embodiment of an inflatable tube of the present invention.
Figure 4:
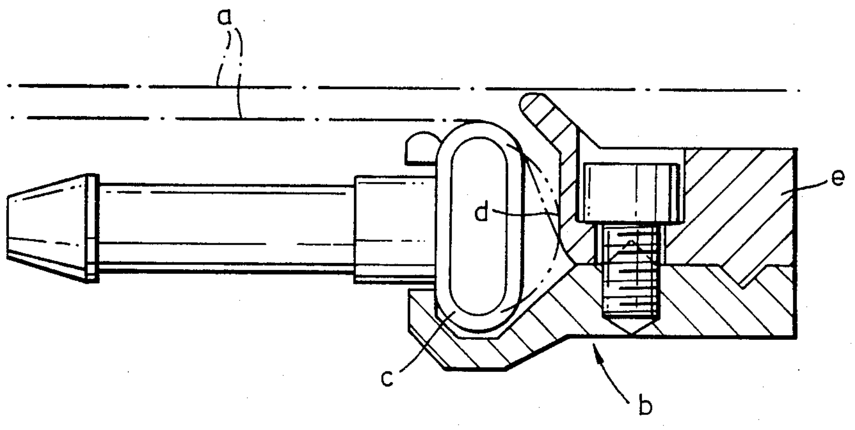
FIG. 4 is a view showing a general schematic construction of the essential part of the conventional frame member.

Referring more particularly to the drawings, there is shown a frame member for pressurized screening device which is applied to a Dalton-type oscillating screen.

Referring now to FIG. 1, the frame (10) in the form of a ring includes a vertical peripheral wall (12) which is, as shown in FIG. 2, provided in the inner side thereof in a circumferential direction. Thus, the peripheral wall (12) defines an opening (14) therein and a screen (16) is stretched over the opening (14) to cover the same (14). The screening device has an oscillating motor (not shown) operatively connected to the frame (10) to oscillate the frame (10) and screen (16), whereby material placed on the screen (16) can be subjected to a treatment for removal of foreign matter, filtration or dehydration.

An inflatable tube (18), which is an essential part of the present invention, is disposed along and outwardly of the peripheral wall (12). The inflatable tube (18) is formed with a specific tube, for example, three-layer structure made of cloth coated by rubber on the outer sides. The inflatable tube (18) has an inlet portion (20) extending through a slot (22) in the frame (10). The inflatable tube (18) is connected through the inlet portion (20) to a pressure source (not shown), thus compressed gas and the like being permitted to flow to the tube (18). The pressure source may be a source of compressed air or other gas or a hydraulic pressure source. The upper edge of the peripheral wall (12) is lower than the maximum height of the inflatable tube (18).

Moreover, the frame (10) has a radially extending screen attaching portion (26) disposed outwardly of the tube (18) and means for holding the tube between the screen attaching portion (26) and the peripheral wall (12). The means for holding the tube (18) comprises a substantially U-shaped channel (28) formed integrally with the frame (10) for receiving the tube (18) therein. The channel (28) is defined by the peripheral wall (12), a partition wall (30) spaced from and opposed to the peripheral wall (12) and a bottom wall (31) substantially horizontally extending from the peripheral wall (12) to the partition wall (30) at their respective lower extremities. The inflatable tube (18) is of a substantially rectangular cross section having a left side portion (32), a right side portion (34), a base portion (36) and a top portion (38). The left side portion (32), the right side portion (34) and the base portion (36) of the rectangular cross section are disposed along the peripheral wall (12), the partition wall (30) and the bottom wall (31), respectively. The top portion (38) is designed to be concave in its uninflated state and convex in its extremely inflated state.

Moreover, the inflatable tube (18) is designed to deform the top portion (38) thereof in a direction of an arrow in FIG. 2, that is, a vertical direction relative to the screen (16) in taut state, when compressed gas or liquid is entered through the air valve into the inflatable tube (18).

The screen (16) extends over the peripheral wall (12) and the tube (18) to the upper surface of the screen attaching portion (26), the upper surface of the screen attaching portion (26) being located below the levels of the upper edge portion of the peripheral wall (12) and the upper edge of the inflatable tube (18) when the latter is inflated. Further, the screening device of this invention has a holder member (44) in the form of a ring and a plurality of, e.g., several, cap bolts (46). The holder member (44) is disposed on the upper surface of the screen attaching portion (26) and is removably mounted on and fastened to the screen attaching portion (26) by the cap bolts (46) to sandwich the screen (16) between the upper surface of the screen attaching portion (26) and the lower surface of the holder member (44). Each bolt (46) is inserted through a hole (48) in the holder member (44) and screwed into a threaded hole (50) in the screen attaching portion (26).

The inflatable tube (18) is only inflatable in a direction transverse to a direction of the stretching of the screen (16) and in such a manner as not to touch the holder member (44). Thus, the tube (18) is brought into contact with the screen (16) and tension can be imparted to the screen (16) by the tube (18).

This arrangement can impart suitable tension to the screen (16) without touching the inner surface (52) of the holder member (44) and prevents effectively from heavy vibrations which the screen (16) is subjected to, when this is employed.

In addition, the inflatable tube (18) applicable to the present invention is not restricted to a tube with the top portion (38) thereof being concave as shown by a continuous line in FIG. 2, and can be freely selected among tubes to be able to impart desired tautness to the screen (16) without touching the inner surface (52) of the holder member (44). As illustrating in FIGS. 2 and 3, the tube (18), which does not deform itself and is only inflatable in one direction, can be obtained an excellent cushion effect and can be preferably used. The material of the tube (18) is not restricted to the three-layer structure described in this embodiment. For example, simple substance of rubber, rubber coated cloth, synthetic sheets and the like can be used according to the use of the screening device.

In this embodiment, joint means for securing a peripheral edge of the screen (16) is so constructed to sandwich the screen (16) between the screen attaching portion (26) and the holder member (44), as a pressing ring, to screw the screen (16) therebetween by means of a few cap bolts (46). The screen attaching portion (26) is formed to be a V-shaped projection (54) at the inner side thereof and a V-shaped groove (56) at the outer side thereof, respectively. On the other hand, the holder member (44) is formed to be a V-shaped groove (58) at the inner side thereof and a V-shaped projection (60) at the outer side thereof, corresponding to the configuration of the upper surface of the screen attaching portion (26). The V-shaped projection (54), (60) is complemental and engageable with the V-shaped groove (58), (56) respectively and vice versa. The projection (54), (60) are engaged with the groove (58), (56) and cooperate with the same to position the holder member (44) with respect to the screen attaching portion (26) and prevent the screen (16) from slipping off. As a result, when the V-shaped projections (54), (60) are gradually entered into the V-shaped grooves (58), (56), the peripheral edge of the screen (16), which tends to slide toward an inner direction of the frame (10), can be hitched at the tip of the V-shaped projections (54), (60). Therefore, when the projections (54), (60) bottom against the grooves (58), (56), the screen (16) can be imparted an initial tension of considerable amount. When the top portion (38) of the rubber tube (18) is inflated as shown by an alternate long and two short dashes line, the frame (10) having a screen (16) in a considerably taut state can be obtained. The frame (10) has an excellent performance of screening and the cap bolts (46), (46) . . . are screwed through the holes (48) in the holder member (44) into the threaded holes (50) provided in the screen attaching portion (26) such that the projections (54), (60) are inserted into the grooves (58), (56). As a result, the screen (16) is firmly secured to the frame (10) in place without slipping off.

In addition, although a couple of joint means comprising of a projection and a groove are provided in the above embodiment, it is to be understood that the number of the joint means is not limited to the specific embodiment. For example, in a case where the joint means is not provided, the screen (16) can be fixed in place by a pressing force of sufficient amount. The object of the invention can be, however, more effectively obtained by providing a couple of the joint means so as to fix the edge portion of the screen (16) over a long period as tautly as possible. It is appreciated that it is desirable to provide the joint means as many as possible.

Furthermore, as a screening device of this invention is imparted suitable tautness by the inflatable tube (18) as described above, it is difficult to apply the above device to the screen (16) having too high rigidity. Therefore, this mechanism is an industrial screen comprised of wire rod made of carbon fiber, stainless steel, zinc coated iron, hard steel, brass, copper, bronze, aluminum, monel, nickel, silk, synthetic fiber such as Nylon, polyester, polyethylene and so forth. The industrial screen, of which the mesh is finer than 60 meshes and the size of the wire is more than No. 35 under S.W.G. (Standard Wire Gauge), can be preferably used.

The steps for attaching the screen (16) to the frame (10) will be described in the following.

When the screen (16) of a suitable size is, as shown in FIG. 2, disposed on the upper surface of the frame (10) and sandwiched the edge thereof between the holder member (44) and the screen attaching portion (26) to screw by means of the cap bolts (46), (46) . . . , the screen (16) is extended through the top portion (38) of the tube (18) and the lower edge portion of the holder member (44) and is firmly secured in place. When compressed air is, thereafter, entered through the air valve in the tube (18) and the tube (18) made of rubber is inflated, the screen (12) is gradually inflated, controlling to be desired tautness as shown in an alternate long and two dashes line. In addition, in a case where the screen (16) is removed from the frame (10), it can be obtained by the reverse steps of the above steps.

EXAMPLE

The following examples serves to illustrate the invention in more detail although the invention is not limited to the examples. Unless otherwise indicated, parts and % signify parts by weight and % by weight, respectively.

Coating color comprising of the following composition may be controlled by Cowles dissolver to obtain coating color of 60% in solid concentration and 600 cps of viscosity (measured by Brookfield viscometer).

| | |
|---|---|
| kaolin (UW-90 manufactured by EMC Co.) | 80 parts |
| heavy calcium carbonate (SOFUTON 2200 manufactured by Bihoku Funka Kougyo) | 20 parts |
| styrene-butadiene copolymer latex (SN-307 manufactured by Sumitomo Naugatuch) | 10 parts |
| Oxidized denatured starch (Ace A manufactured by Oji Cornstarch Co.) | 5 parts |
| polyacrylic soda | 0.3 parts |

Next, A screen frame made of rubber tube of the present invention having a specific configuration in cross section and a conventional screen frame made of rubber tube having a circular configuration in cross section are prepared. Screens made of stainless steel, of which the mesh is 200 meshes and the size of the wire is 40 μm in diameter, are attached to the above frames as tautly as possible. The measurement of these tension by tensionometer indicates that the tautness of the conventional screen frame is 6.8 Newton/m, while that of the screen frame of the present invention is 13.0 Newton/m.

Subsequently, both the screen frames are attached to an one-stage Dalton-type oscillating screen and are compared by applying oscillations of 1800 vpm to the above coating color. In a conventional screen frame, the performance for treating the coating color is 25.2 ton/Hr.m$^2$ and the screen has broken in the portion between the inner surface of the holder member and in the contact portion after a continuous operation over about 240 hours. On the other hand, in case of the screen frame of the present invention, the performance for treating the coating color is 35.3 ton/Hr.m$^2$ and the screen frame has broken after a continuous operation over about 600 hours.

Accordingly, the screen frame of the present invention is excellent in performance for treating material and durability of the screen compared with the conventional one, in particular the durability of the screen is extremely excellent.

As has been described so far, in case of the frame member for pressurized screening device according to the present invention, tension can be distributed uniformly throughout the screen by an upward inflation of the inflatable tube to establish the desired tautness of the screen, requiring no skill. As heavy vibrations which the screen is subjected to, and relaxations of the screen itself which is produced by its own deformation can be eliminated by the cushion effect of the tube made of rubber. The breakage of the screen can be decreased and a continuous operation of the screening device can be obtained over a long period.

Further, as the inflatable tube is only inflatable in a direction transverse to the direction of the stretching of the screen and in such a manner as not to touch the holder member, the screen will not be broken when the tube is inflated.

Furthermore, as the right side portion of the tube is disposed along the partition wall formed integrally with the frame, the partition wall prevents the tube from inflating in an exterior direction (a right side direction in FIG. 2) relative to the frame. Thus, the tube does not touch the inner surface of the holder member at all.

Furthermore, the frame member of the invention does not require several tens of cap bolts to be used as in the prior art but required only several bolts to be used in stretching the screen. As a result, an operation for screwing cap bolts can be remarkably reduced.

It is further understood by those skilled in the art that the foregoing description is a preferred embodiment of the disclosed device and that various changes and modifications may be made in the invention without departing from the spirit and scope thereof.

What is claimed is:

1. A frame member for pressurized screening device comprising:

a frame including a vertical peripheral wall, said peripheral wall defining an opening therein, a screen stretched over said opening to cover the same, an inflatable tube disposed along and outwardly of said peripheral wall, said tube being connected to a pressure source, said frame having a radially extending screen attaching portion disposed outwardly of said tube and means for holding said tube between said screen attaching portion and said peripheral wall, said screen extending over said peripheral wall and said tube to the upper surface of the screen attaching portion, said means for holding said tube comprising a substantially U-shaped channel formed integrally with said frame for receiving said tube therein, said channel being defined by said peripheral wall, a partition wall spaced from and opposed to said peripheral wall and a bottom wall substantially horizontally extending from said peripheral wall to said partition wall at their respective lower extremities, said inflatable tube being of a substantially rectangular cross section having a left side portion, a right side portion, a base portion and a top portion; said left side portion, said right side portion and said base portion of said rectangular cross section being disposed along said peripheral wall, said partition wall and said bottom wall, respectively and said top portion being concave in its uninflated state and convex in its extremely inflated state, a holder member disposed on said upper surface of the screen attaching portion sandwiching the screen between the upper surface of the screen attaching portion and the lower surface of the holder member, said holder member including an inside peripheral wall surface spaced from and opposed to said partition wall, said inflatable tube being only inflatable in a direction transverse to the direction of the stretching of said screen and in such a manner as to be prevented from contacting said inside peripheral wall surface of said holder member, whereby said tube is brought into contact with said screen and tension can be imparted to said screen by said tube, and a plurality of cap bolts for removably mounting the holder member on the upper surface of said screen attaching portion.

2. A frame member for pressurized screening device as set forth in claim 1, wherein said inflatable tube is inflated in a vertical direction relative to the screen in a taut state.

3. A frame member for pressurized screening device as set forth in claim 1, wherein said tube is inflated to project above the upper edge of said peripheral wall and the screen is engaged by the projecting portion of said tube but not contacted with the upper edge of said peripheral wall and said peripheral wall surface of said holder member.

4. A frame member for pressurized screening device as set forth in claim 1, wherein said cap bolts are screwed through holes in said holder member into threaded holes in said screen attaching portion, the screen being firmly attached to the frame.

5. A frame member for pressurized screening device as set forth in claim 1, further including a joint means between the upper surface of said screen attaching portion and the lower surface of said holder member, said joint means comprising V-shaped grooves and projections complemental and engageable with said V-shaped grooves, said V-shaped grooves and projections cooperating to position said holder member with respect to said screen attaching portion and prevent said screen from slipping off.

6. A frame member for pressurized screening device as set forth in claim 5, wherein said holder member has a V-shaped groove at inner side thereof and a V-shaped projection at outer side thereof, and said screen attaching portion has a V-shaped projection at inner side thereof and a V-shaped groove at outer side thereof, corresponding to said V-shaped groove and projection of said holder member.

7. A frame member for pressurized screening device as set forth in claim 1, wherein said tube has an inlet portion extending through said frame and is connected to a source of compressed air or other gas.

8. A frame member for pressurized screening device as set forth in claim 1, wherein said tube has an inlet portion extending through said frame and is connected to a hydraulic pressure source.

* * * * *